United States Patent
Kaita et al.

(10) Patent No.: US 8,163,860 B2
(45) Date of Patent: Apr. 24, 2012

(54) NORBORNENE COPOLYMER AND PRODUCTION METHOD THEREOF

(75) Inventors: Shojiro Kaita, Wako (JP); Nobuyuki Kibino, Oita (JP); Kazufumi Kai, Minato-ku (JP)

(73) Assignees: Showa Denko K.K., Tokoy (JP); Riken, Saitama (JP)

( * ) Notice: Subject to any disclaimer, the term of this patent is extended or adjusted under 35 U.S.C. 154(b) by 0 days.

(21) Appl. No.: 13/146,600

(22) PCT Filed: Jan. 29, 2010

(86) PCT No.: PCT/JP2010/051726
§ 371 (c)(1),
(2), (4) Date: Jul. 27, 2011

(87) PCT Pub. No.: WO2010/087528
PCT Pub. Date: Aug. 5, 2010

(65) Prior Publication Data
US 2011/0282014 A1    Nov. 17, 2011

(30) Foreign Application Priority Data
Jan. 29, 2009    (JP) ................................. 2009-018170

(51) Int. Cl.
C08F 232/04    (2006.01)
C08F 4/70    (2006.01)

(52) U.S. Cl. ........ 526/281; 526/134; 526/139; 526/145; 526/171

(58) Field of Classification Search .................. 526/134, 526/139, 145, 281, 171
See application file for complete search history.

(56) References Cited

U.S. PATENT DOCUMENTS
3,330,815 A    7/1967    McKeon et al.
2002/0128408 A1*    9/2002    Goodall et al. ............... 526/171

FOREIGN PATENT DOCUMENTS
| | | |
|---|---|---|
| EP | 0445755 A2 | 9/1991 |
| JP | 3678754 B2 | 8/2005 |
| JP | 2008-031304 A | 2/2008 |
| WO | 2006/064814 A1 | 6/2006 |
| WO | 2007/055406 A1 | 5/2007 |
| WO | WO 2008/002066 A1 * | 1/2008 |

* cited by examiner

*Primary Examiner* — Fred M Teskin
(74) *Attorney, Agent, or Firm* — Sughrue Mion, PLLC (57) ABSTRACT

The invention relates to a norbornene copolymer having excellent properties such as transparency, heat resistance, low water absorption and electric insulating property, which copolymer comprises a monomer unit represented by formula (1) and formula (2)

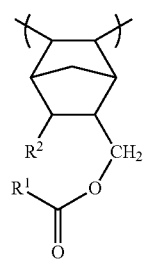

(1)

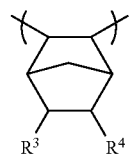

(2)

and having a number average molecular weight (Mn) of 300,000 to 2,000,000.

(In the formulae, $R^1$ represents an alkyl group having 1 to 10 carbon atoms; and $R^2$, $R^3$ and $R^4$ independently represent a hydrogen atom or an alkyl group having 1 to 10 carbon atoms.)

14 Claims, 5 Drawing Sheets

NORBORNENE COPOLYMER AND PRODUCTION METHOD THEREOF

TECHNICAL FIELD

The present invention relates to a norbornene copolymer containing a polar group and a production method thereof.

BACKGROUND ART

Conventionally, vinyl addition polymers of cyclic olefins represented by norbornene polymers have been industrially used in the field of optical films and the like as an organic material being excellent in heat resistance and transparency. There have been various reports that such vinyl addition polymers of cyclic olefins can be produced by the addition polymerization of cyclic olefin monomer(s) using a catalyst containing transition metals such as Ti, Zr, Cr, Co, Ni and Pd.

For example, the European Patent Publication No. 0445755 (Patent Document 1) reports that a vinyl addition homopolymer of norbornene having the number average molecular weight exceeding 1,000,000 can be produced by polymerizing a norbornene monomer alone by using a transition metal compound of elements belonging to five to ten groups of the periodic table as a main catalyst and methylaluminoxane (MAO) as a cocatalyst. However, polymerization of norbornene containing polar group which has higher difficulty has not been conducted with this catalyst system, and in addition to concerns about the catalyst deactivation due to the influence of the polar group, the obtained polymer was not a monodisperse polymer wherein the molecular weight distribution (Mw/Mn) exceeds 2.5.

Meanwhile, U.S. Pat. No. 3,330,815 publication (Patent Document 2) discloses vinyl addition homopolymers of norbornene containing polar group and copolymers with norbornene. However, the patent has not reported an example where a polymer having a number average molecular weight exceeding 10,000. Also, the polymerization activity of the catalyst is low so that the production method was far from being an industrially useful method.

Moreover, Japanese Patent Publication No. 3678754 (WO96/37526; Patent Document 3) and JP-A-2008-31304 publication (Patent Document 4) disclose a method for improving an addition polymerization of a norbornene monomer alone containing polar group or copolymerization with norbornene. Though these methods improved both of polymerization activity and molecular weight of the obtained polymer, they only disclose copolymer having number average molecular weight less than 200,000 in examples and have not succeeded in producing copolymers having number average molecular weight of 200,000 or more which is required for various mechanical properties to be developed to a practical level. In Table 1 of Patent Document 4, the number average molecular weight (Mn) entries and the weight average molecular weight (Mw) entries replace each other. It is obvious from that Mw/Mn values should be around 2.5, and it is clear that a copolymer having a number average molecular weight exceeding 200,000 did not exist if data in Table 1 are interpreted properly.

Contrary to these methods, International publication No. WO06/064814 (EP 1826221; Patent Document 5) discloses that addition copolymerization of norbornene containing polar group and norbornene can be efficiently performed by using compounds of transition metals belonging to eighth to tenth groups of the periodic table as a main catalyst in combination with a cocatalyst capable of producing a cationic transition metal compound through the reaction with the main catalyst to thereby obtain copolymers having high molecular weight. However, the norbornene compound disclosed by the publication has a structure wherein an ester group is directly introduced into a norbornene skeleton, and since the distance between the carbon-carbon double bonding site and the polar group is short, the norbornene compound easily forms coordinate bonding with a transition metal complex as a catalyst, resulting in catalyst deactivation. Accordingly, the method enables producing a polymer having high activity and high molecular weight in addition polymerization of a norbornene monomer alone. However, in case of using a norbornene compound having a polar group, a copolymer having high molecular weight can be obtained but the catalyst activity of the copolymer was low.

From the description of these prior art documents, it can be seen that a high-activity catalyst system capable of obtaining a copolymer having a number average molecular weight as high as 200,000 or more in addition copolymerization of a norbornene compound containing a polar group, which system experiences little deactivation even when a norbornene compound containing a polar group was used, was previously unknown.

As discussed above, in a method for producing addition copolymers of norbornene containing a polar group, there have been no previous cases making it available to combine a high activity catalyst and a norbornene compound having a polar group to thereby obtain a copolymer having practical mechanical properties. Consequently, a method for sufficiently producing a copolymer which can be developed for practical by finding out an appropriate combination of a high activity catalyst and a norbornene compound containing a polar group has been demanded.

PRIOR ART

Patent Documents

[Patent Document 1] European patent publication No. 0445755
[Patent Document 2] U.S. Pat. No. 3,330,815
[Patent Document 3] Japanese Patent No. 3678754
[Patent Document 4] Japanese Patent Publication No. 2008-31304
[Patent Document 5] International Publication No. WO06/064814

SUMMARY OF THE INVENTION

Problems to be Solved by the Invention

An objective of the present invention is to provide high-molecular weight addition copolymers of a norbornene compound containing a polar group and a method for efficiently producing the same.

Methods to Solve the Problems

As a result of intensive studies to solve the above problems, the present inventors have found that a high-molecular weight addition copolymers of a norbornene compound can be produced efficiently by combining a catalyst group using a transition metal compound belonging to eight to ten groups of the periodic table having cyclopentadienyl ring as a main catalyst and a norbornene compound in which a methylene chain is introduced between a norbornene skeleton and an ester group so as to distance the polymerizable carbon-carbon double bond from the polar group (ester group), and have completed the present invention.

That is, the present invention relates to the following 1 to 10:

1. A norbornene copolymer comprising a monomer unit represented by formula (1) and formula (2)

(1)

(2)

and having a number average molecular weight (Mn) of 300,000 to 2,000,000.

(In the formulae, $R^1$ represents an alkyl group having 1 to 10 carbon atoms; and $R^2$, $R^3$ and $R^4$ independently represent a hydrogen atom or an alkyl group having 1 to 10 carbon atoms.)

2. The norbornene copolymer as described in above 1 comprising a monomer unit represented by formula (1) and formula (2) only.

3. The norbornene copolymer as described in above 1 or 2 having a molecular weight distribution (Mw/Mn) of 1.0 to 2.5.

4. The norbornene copolymer as described in above 1 or 2, wherein $R^1$ in formula (1) is a methyl group.

5. The norbornene copolymer as described in any one of above 1 to 4, wherein $R^2$ in formula (1) and $R^3$ and $R^4$ in formula (2) is a hydrogen atom.

6. The norbornene copolymer as described in any one of above 1 to 5 comprising the monomer unit represented by formula (1) in an amount of 10 to 70 mol %.

7. A method for producing the norbornene copolymer as described in any one of above 1 to 6 characterized in using a catalyst comprising the following main catalyst (A), cocatalyst (B) and phosphine ligand (C):

main catalyst (A):
a complex represented by formula (3)

$$ML_nK1_xK2_yK3_z \qquad (3)$$

(In the formula, M represents one transition metal selected from the elements belonging to eight, nine or ten group of the periodic table; L represents cyclopentadienyl ligand comprising cyclopentadienyl or a derivative thereof; K1, K2 and K3 represent an anionic ligand or a neutral ligand which are different from each other; n is an integer of 1 to 3; x, y and z are 0 or an integer the total of which comes to 1 to 7.)

cocatalyst (B):

At least one compound selected from an organic aluminum compound (a), an ionic compound (b) capable of producing a cationic transition metal compound through the reaction with the main catalyst (A) and a compound (c) promoting the release of the ligand in the complex constituting the main catalyst (A).

phosphine ligand (C).

8. A method for producing the norbornene copolymer as described in above 7, wherein in formula (3) representing a main catalyst (A) M is nickel or palladium; L is cyclopentadienyl; and K1, K2 and K3 independently represent methyl group or allyl group.

9. A method for producing the norbornene copolymer as described in above 8, wherein the main catalyst (A) is cyclopentadienyl(n-allyl)palladium.

10. A method for producing the norbornene copolymer as described in above 7, wherein the cocatalyst (B) is tris(pentafluorophenyl)boron, trityltetrakis(pentafluorophenyl)borate or N,N-dimethylaniliniumtetrakis(pentafluorophenyl)borate.

Effects of the Invention

The present invention enables efficiently producing high-molecular weight addition copolymers of norbornene and a norbornene compound containing a polar group. The norbornene copolymer obtained by the present invention has excellent properties such as transparency, heat resistance, low water absorption and electric insulating property, and can be used for many applications such as optics application, application in medical treatment, electronic material application, packaging material application and structural material application.

Specifically, the copolymers can be used for optical molded products such as lenses and polarizing films; electric insulating materials for films, carrier tapes, film capacitors, flexible printed circuit boards, etc.; and medical containers such as press-through packages, infusion bags and chemical vials; food-packaging molded product such as plastic wraps and trays; casings for electric appliances; automobile interior parts such as an inner panel; building materials for a carport, glazing and the like; etc.

MODE FOR CARRYING OUT INVENTION

Hereinafter, the present invention is described in greater detail.

[Vinyl Addition Copolymer of Norbornene]

The norbornene copolymer of the present invention is a copolymer comprising the monomer unit represented by formula (1) and (2)

and having a number average molecular weight (Mn) of 300,000 to 2,000,000.

(In the formulae, $R^1$ represents an alkyl group having 1 to 10 carbon atoms; and $R^2$, $R^3$ and $R^4$ independently represent a hydrogen atom or an alkyl group having 1 to 10 carbon atoms.)

Among the alkyl groups having 1 to 10 carbon atoms represented by $R^1$ in formula (1), alkyl groups having 3 to 10 carbon atoms may be linear or branched.

Examples of linear alkyl groups include methyl group, ethyl group, n-propyl group, n-butyl group, n-pentyl group, n-hexyl group, n-octyl group and n-decyl group.

Examples of branched alkyl groups include isopropyl group, isobutyl group, sec-butyl group, neo-pentyl group, isohexyl group, isooctyl group and isodecyl group.

Preferred among them as $R^2$ are linear alkyl group having 1 to 3 carbon atoms from an economic standpoint. From the viewpoint of costs for producing a monomer, methyl group is particularly preferable.

$R^2$ in formula (1) and $R^3$ and $R^4$ in formula (2) independently represent for a hydrogen atom or alkyl group having 1 to 10 carbon atoms, and the alkyl group having 3 to 10 carbon atoms may be branched. Examples of these alkyl groups include those similar to the above-mentioned alkyl groups as $R^1$. Preferred among them as $R^2$, $R^3$ and $R^4$ is a hydrogen atom from the viewpoint of costs for producing a monomer.

Provided that $R^2$ is a hydrogen atom, the norbornene monomer as a material of the monomer unit represented by formula (1) is 5-acetoxymethyl-2-norbornene when $R^2$ is a linear alkyl group having one carbon atom, 5-[(ethylcarbonyloxy)methyl]-2-norbornene when $R^2$ is a linear alkyl group having two carbon atoms, and 5-[(propylcarbonyloxy)methyl]-2-norbornene when $R^2$ is a linear alkyl group having three carbon atoms.

Provided that $R^3$ and $R^4$ are hydrogen atoms, the norbornene monomer as a material of the monomer unit represented by formula (2) is norbornene.

In the norbornene copolymer of the present invention, the content of the monomer unit represented by formula (1) is preferably 10 to 70 mol %. If the content of the monomer unit represented by formula (1) is less than 10 mol %, hydrophobicity of the copolymer increases, which decreases the solubility of the copolymer in the organic solvent while making the water absorption rate lower. On the other hand, if the content exceeds 70 mol %, the copolymer becomes hydrophilic, which increases the solubility of the copolymer in the organic solvent while making the water absorption rate higher. Accordingly, it is possible to control the solubility in the organic solvent and water absorption rate of the copolymer by adjusting the content of the monomer unit represented by formula (1).

It is preferred that the content of the monomer unit represented by formula (1) be from 10 to 80 mol % in consideration for achieving a good balance between adequate solubility which is required when the norbornene copolymer of the present invention is formed into a film, a sheet and the like and low water absorption of the copolymer, more preferably 15 to 70 mol %, most preferably 20 to 60 mol %. The content of the monomer unit can be calculated from the integration value of $^1$H-NMR spectrum measured by dissolving the copolymer in powder form or film form in an appropriate deuterated solvent.

The norbornene copolymer of the present invention basically comprises monomer units represented by formulae (1) and (2) only. However, even so, it does not exclude the existence of a minute amount, e.g. 1 mol % or less, of the third unit which would not affect the properties of the norbornene copolymer of the present invention. There is no particular limitation on the third monomer, and preferred are monomers having an ethylenic carbon-carbon double bond. Among them, preferred are olefin compounds such as ethylene, propylene and 1-butene and aromatic vinyl compounds such as styrene.

In the norbornene copolymer of the present invention, the bonding mode of each of the monomer units may be random, block or alternate, depending on polymerization conditions. In consideration for enhancement in mechanical properties of the copolymer, random mode is preferred.

The number average molecular weight (Mn) of the norbornene copolymer of the present invention in terms of polystyrene measured by gel permeation chromatography (GPC) is preferably from 300,000 to 2,000,000, more preferably 500,000 to 1,500,000. If the number average molecular weight (Mn) in terms of polystyrene is less than 300,000, mechanical strength of the copolymer becomes insufficient. The number average molecular weight (Mn) in terms of polystyrene exceeding 2,000,000 not only lowers solvent solubility of the copolymer at the time of forming a cast film but also increases solvent viscosity, which degrades molding workability of the copolymer. Also, the molecular weight distribution (Mw/Mn; weight average molecular weight/number average molecular weight) is preferably from 1.00 to 2.50, more preferably 1.05 to 2.00, still more preferably 1.10 to 1.50. If the copolymer has a wide molecular weight distribution range, the copolymer solution becomes less likely to be uniform at the time of forming a cast film, which makes it difficult to produce an excellent film.

The saturated water absorption of the norbornene copolymer of the present invention at 23° C. is generally from 0.001 to 1 mass %, preferably from 0.005 to 0.7 mass %, still more preferably from 0.01 to 0.5 mass %. When the saturated water absorption of the copolymer is within the above-mentioned range, various optical properties such as transparency, phase difference, uniformity of phase difference and dimensional accuracy of the copolymer are maintained even under conditions of high temperature and humidity. Therefore the products are excellent in adhesion properties to the other materials and will not experience peel-off while in use. Also, since the copolymer has good compatibility with additives such as an antioxidant, the copolymer allows increasing addition degree of freedom. The above-mentioned saturated water absorption is determined by dipping the copolymer in water at 23° C. for 24 hours and measuring the increased mass according to the method described in JIS K7209.

The glass-transition temperature (Tg) of the norbornene copolymer of the present invention is generally from 80 to 350° C., preferably from 100 to 320° C., still more preferably from 120 to 300° C. If Tg falls below the above-mentioned range, the heat distortion temperature becomes lower, which may cause a problem for heat resistance and optical properties of the obtained optical film may vary widely with temperature. If Tg is above the above-mentioned range, it increases the likelihood of heat deterioration of the resin when the resin is heated near to Tg during the stretching process.

The norbornene copolymer of the present invention may be used by adding known thermoplastic resin, thermoplastic elastomer, rubber-like polymer, organic fine particles, inorganic fine particles, antioxidant, ultraviolet absorber, mold lubricant, flame retardant, antimicrobial agent, wood powder, coupling agent, petroleum resin, plasticizer, colorant, lubricant, antistatic agent, silicone oil, foaming agent and the like within an extent that does not cause a decrease in transparency and thermal resistance.

Examples of the thermoplastic resin include high-density polyethylene, low-density polyethylene, linear low-density polyethylene, polypropylene, polystyrene and polyvinylchloride.

As thermoplastic elastmer, various olefin and styrene thermoplastic elastmers can be used.

Examples of the rubber-like polymer include acrylic rubber, acrylonitrile butadiene rubber, isoprene rubber, urethane rubber, ethylenepropylene rubber, epichlorohydrin rubber, chloroprene rubber, styrene-butadiene rubber, butadiene rubber, polyisobutylene rubber, silicone rubber and fluoro rubber.

As organic fine particles, fine particles obtained from various polymer emulsions can be used.

Examples of inorganic fine particles include fine particles of copper, silver, nickel, palladium, alumina, zirconia, titanium oxide, barium titanate, aluminum nitride, silica nitride, boron nitride, silicate glass, $CaO.Al_2O_3.SiO_2$ inorganic glass, silicon compound, various carbon black and metal complex.

As an antioxidant, a phenol antioxidant such as 2,6-di-tert-butyl-4-methylphenol and tetrakis-[methylene-3-(3',5'-di-tert-butyl-4-hydroxyphenyl)propionate]methane; a sulfuric antioxidant such as dilauryl-3,3'-thiodipropionate and a phosphoric antioxidant such as tris(nonylphenyl)phosphite can be used.

Examples of the ultraviolet absorber include triazole such as 2-(2'-hydroxy-tert-butylphenyl)benzotriazole; benzophenone such as 2,4-dihydrobenzophenone; salicylate such as 4-tert-butylphenylsalicylate; and hindered amine such as bis-(2,2,6,6-tetramethyl-4-piperidinyl)sebacate.

Examples of the mold lubricant include stearin acid, butyl stearate, zinc stearate, stearic amide, fluorine compounds and silicon compounds.

As flame retardant, bromine flame retardant such as tetrabromobisphenol A, decabromodiphenyl ether, bis(tetrabromophthalimide)ethane, bis(pentabromophenyl)ethane; phosphoric flame retardant such as triphenylphosphate, cresyl diphenyl phosphate, tricresyl phosphate and trixylenyl phosphate; and inorganic flame retardant such as antimony trioxide, antimony pentoxide and magnesium hydroxide can be used.

Examples of the antimicrobial agent include penicillin antimicrobial agent, cephem antimicrobial agent, aminoglycoside antimicrobial agent, macrolide antimicrobial agent, tetracycline antimicrobial agent and new quinolone antimicrobial agent.

Examples of the coupling agent include a silane coupling agent, a titanium coupling agent and an aluminate coupling agent.

Examples of the petroleum resin include aromatic petroleum resin which is a polymer of C9 petroleum fraction such as vinyl toluene, alkyl styrene and indene; and aliphatic petroleum resin which is a polymer of C5 petroleum fraction such as isoprene and cyclopentadiene.

Examples of the plasticizer include phthalate ester, adipate ester, trimellitate ester, phosphate ester, citrate ester, sebacate ester, azelaic acid ester, maleic acid ester, benzoate ester, epoxidized vegetable oil and polyester.

Examples of the colorant include organic dye such as anthraquinone dye, azo dye, carbonium dye, quinoline dye, quinone imine dye, indigoid colorant and phthalocyanine colorant; and inorganic dye such as titanium yellow, iron oxide yellow, zinc yellow, chrome orange, molybdenum red, cobalt purple, cobalt blue, cobalt green, chrome oxide, titanium oxide, zinc sulfide and carbon black.

Examples of the lubricant include hydrocarbon lubricant such as liquid paraffin, paraffin wax and polyethylene wax; and fatty acid lubricant such as stearyl alcohol, stearic acid and 12-hydroxystearic acid.

Examples of the antistatic agent include glycerin fatty acid ester, acetylated monoglyceride, organic acid monoglyceride, medium chain fatty acid triglyceride, diglycerin fatty acid ester, polyglycerin fatty acid ester, sorbitan fatty acid ester, propylene glycol fatty acid ester, higher alcohol fatty acid ester and ethylene oxide adduct.

Examples of the silicone oil include dimethyl silicone oil, methyl hydrogen silicone oil, methylphenyl silicone oil and cyclic dimethyl silicone oil.

Examples of the foaming agent include an inorganic foaming agent such as ammonium carbonate and sodium hydrogen carbonate; and an organic foaming agent such as azodicarbonamide, N,N'-dinitroso-pentamethylene-tetramine and 4,4'-oxybis(benzenesulfonyl hydrazide).

The norbornene copolymer represented by formula (1) can be made into a film by film formation through a solution casting method. A solvent such as toluene, tetrahydrofurane (THF), dichloromethane and chloroform can be used.

[Production Method]

The norbornene copolymer of the present invention can be produced by using a catalyst comprising a main catalyst (A), a cocatalyst (B) and a ligand (C) as described below.

main catalyst (A):

a complex represented by formula (3)

$$MLnK1xK2yK3z \qquad (3)$$

(In the formula, M represents one transition metal selected from the elements belonging to eight, nine or ten group of the periodic table; L represents cyclopentadienyl ligand comprising cyclopentadienyl or a derivative thereof; K1, K2 and K3 represent an anionic ligand or a neutral ligand which are different from each other; n is an integer of 1 to 3; x, y and z are 0 or an integer the total of which comes to 1 to 7.)

cocatalyst (B):

At least one compound selected from an organic aluminum compound (a), an ionic compound (b) capable of producing a cationic transition metal compound through the reaction with the main catalyst (A) and a compound (c) promoting the release of the ligand in the complex constituting the main catalyst (A).

phosphine ligand (C).

The main catalyst (A), cocatalyst (B) and phosphine ligand (C) used in the present invention are described hereinafter.

[Main Catalyst (A)]

Specific examples of M in formula (3) include iron (Fe), cobalt (Co), nickel (Ni), ruthenium (Ru), rhodium (Rh), palladium (Pd) and platinum (Pt). Among these, preferred are cobalt, nickel, palladium and platinum from the perspective of increasing polymerization activity of the catalyst, and nickel and palladium are particularly preferred.

L in formula (3) is a cyclopentadienyl ligand selected from cyclopentadienyl and a derivative thereof. n representing the coordination number of ligand L is an integer of 1 to 3. The number of n is preferably 1.

Specific examples of L when L is a cyclopentadienyl derivative include substituted cyclopentadienyl in which a hydrogen atom of cyclopentadienyl is substituted by a substituent as described below, indenyl and fluorenyl. A derivative in which a hydrogen atom of indenyl and fluorenyl is substituted by a similar substituent is also included in a cyclopentadienyl derivative.

Examples of substituent of the substituted cyclopentadienyl include a hydrocarbon group having 1 to 20 carbon atoms such as methyl group, ethyl group, n-propyl group, isopropyl group, n-butyl group, t-butyl group, phenyl group, benzyl group and neopentyl group; and silyl group substituted with a hydrocarbon group such as trimethylsilyl group.

Examples of a substituent of the substituted cyclopentadienyl include a polar substituent having a hetero atom such as an oxygen atom, nitrogen atom, sulfur atom, a phosphorous atom and a halogen atom. Examples of such a substituent include RO group, RCO group, ROCO group, RCOO group, $R_2N$ group, $R_2NCO$ group, NC group, RS group, RCS group, RSO group and $R_2S$ group. Here, R represents a hydrocarbon group having 1 to 12 carbon atoms, and when a plurality of R exist, they may be the same or different to each other. Specific examples of R include alkyl group such as methyl group, ethyl group, n-propyl group, isopropyl group, n-butyl group, t-butyl group, hexyl group and octyl group; aryl group such as phenyl group; and aralkyl group such as benzyl group. Among these, particularly preferred is an alkyl group having 1 to 4 carbon atoms.

Examples of a substituent of the substituted cyclopentadienyl further include methoxy group, ethoxy group, t-butoxy group, acetyl group, propionyl group, dimethylamino group, nitrile group, dimethylaminocarbonyl group and diethylaminocarbonyl group.

Preferred examples of L are cyclopentadienyl, cyclopentadienyl having 1 to 5 methyl groups, phenylcyclopentadienyl, benzylcyclopentadienyl and indenyl.

K1, K2 and K3 in formula (3) are an anionic ligand or a neutral ligand which are different to each other. x, y and z representing the number of the ligand is 0 or an integer and the sum of x, y and z is 1 to 7. x, y and z are preferably an integer of 0 or 1, independently.

Examples of K1, K2 and K3 when they are an anionic ligand include:

a hydrogen atom; an oxygen atom; a halogen atom of fluorine, chlorine, bromine and iodine; an alkyl group having 1 to 20 carbon atoms and a linear or branched chain such as methyl group, ethyl group, n-propyl group, isopropyl group, n-butyl group, t-butyl group, isobutyl group, octyl group and 2-ethylhexyl group; an aryl group, alkylaryl group or arylalkyl group having 6 to 20 carbon atoms such as phenyl group, tolyl group, xylyl group and benzyl group; a hydroxyl group; an alkoxy group having 1 to 20 carbon atoms such as methoxy group, ethoxy group, propoxy group and butoxy group; an aryloxy group having 6 to 20 carbon atoms such as phenoxy group, methylphenoxy group, 2,6-dimethylphenoxy group, naphthyloxy group; a dialkylamino group or a diarylamino group having 3 to 20 carbon atoms and an alkyl substituent such as dimethylamino group, diethylamino group, di(n-propyl)amino group, di(isopropyl)amino group, di(n-butyl) amino group, di(t-butyl)amino group, di(isobutyl)amino group, diphenylamino group and methylphenylamino group; π-allyl group; a substituted allyl group having 3 to 20 carbon atoms; an acetylacetonato group; a substituted acetylacetonato group having 5 to 20 carbon atoms; a silyl group substituted with a hydrocarbon group such as trimethylsilyl group; a carbonyl group; and a carboxyl group.

Examples of K1, K2 and K3 when they are an a neutral ligand include:

an oxygen molecule; a nitrogen molecule; ethylene; ether such as diethylether and tetrahydrofurane; nitrile such as acetonitrile and benzonitrile; ester such as ethylbenzoate; amine such as triethylamine, 2,2-bipiridyne and phenanthoroline; a silicon-substituted hydrocarbon group such as (trimethylsilyl)methyl; Lewis base such as sulfoxide, isocyanide, phosphonic acid and thiocyanate; aromatic hydrocarbon such as benzene, toluene and xylene; cyclic unsaturated hydrocarbon such as cycloheptatriene, cyclooctadiene, cyclooctatriene, cyclooctatetraene and a derivative thereof.

All of the K1, K2 and K3 in formula (3) may be an anionic ligand or a neutral ligand, or one or two of them may be an anionic ligand while the other(s) is (are) a neutral ligand.

Specific examples of main catalyst (A) represented by formula (3) include cyclopentadienyl(methyl)(triphenylphosphine)nickel, methylcyclopentadienyl(methyl) (triphenylphosphine)nickel, pentamethylcylcopentadienyl (methyl)(triphenylphosphine) nickel, indenyl(methyl)(triphenylphosphine)nickel, fluorenyl(methyl)(triphenylphosphine)nickel, cyclopentadienyl(methyl)(tricyclophosphine) nickel, pentamethyl cyclopentadienyl(methyl) (tricyclophosphine)nickel, indenyl(methyl) (tricyclohexylphosphine)nickel, fluorenyl(methyl) (tricyclohexylphosphine)nickel, cyclopentadienyl(π-allyl) palladium, methylcyclopentadienyl(π-allyl)palladium, pentamethylcyclopentadienyl(π-allyl)palladium, indenyl(n-allyl)palladium and fluorenyl(π-allyl)palladium.

These transition metal complexes represented by formula (3) can be produced by, for example, a method as described in Shaw. B. L., Proc. Chem. Soc., 1960, 247.

Cocatalyst (B) used in the present invention is at least one compound selected from an organic aluminum compound (a), an ionic compound (b) capable of producing a cationic transition metal compound through the reaction with the main catalyst (A) and a compound (c) promoting the release of the ligand in the complex constituting the main catalyst (A). One of these compounds may be used singly or two or more of them may be used in combination.

<Organic Aluminum Compound (a)>

Organic aluminum compound (a) means an aluminum compound having a hydrocarbon group. Examples of the compound include organoaluminum, organoaluminum halide, organoaluminum hydride and organoaluminum oxy compound.

Among these, examples of an organoaluminum compound include trimethylaluminum, triethylaluminum, triisobutylaluminum, trihexylaluminum and trioctylaluminum. Examples of an organoaluminum halide include dimethylaluminum chloride, diethylaluminum chloride, ethyl aluminum sesquichloride and ethylaluminum dichloride. Examples of an organoaluminum hydride include diethylaluminum hydride and ethylaluminum sesquihydride. An organoaluminum oxy compound is also referred to as aluminoxane, which is a linear or cyclic polymer represented by formula (—Al(R')O—)$_m$. Here, R' represents hydrocarbon group having 1 to 10 carbon atoms, and include one which is partially substituted with a halogen atom and/or R'O group. m represents a polymerization degree and is 5 or more, preferably 10 or more. Examples of R' include methyl group, ethyl group, propyl group and isobutyl group.

Preferred examples of an organoaluminum compound (a) are an organoaluminum halide and organoaluminum oxy compound, and particularly, diethylaluminum chloride, sesquiethylaluminum chloride, methylaluminoxane, ethylaluminoxane and ethylchloroaluminoxane are preferable.

<Ionic Compound (B)>

Examples of ionic compound (b) capable of producing a cationic transition metal compound through the reaction with the main catalyst (A) include an ionic compound combining non-coordinating anions and cations as described below.

Examples of non-coordinating anions include tetra(phenyl)borate, tetra(fluorophenyl)borate, tetrakis(difluorofphenyl)borate, tetrakis(trifluorophenyl)borate, tetrakis(tetrafluorophenyl)borate, tetrakis(pentafluorophenyl)borate, tetrakis (tetrafluoromethyl phenyl)borate, tetra(triyl)borate, tetra (xylyl)borate, (triphenylpentafluorophenyl)borate, [tris (pentafluorophenyl)phenyl]borate and tridecahydride-7,8-dicarbaundeca-borate.

Examples of the above-mentioned cation include carbonium cation, oxonium cation, ammonium cation, phosphonium cation, cycloheptyltrienyl cation and ferrocenium cation having transition metal.

Specific examples of the carbonium cation include trisubstituted carbonium cation such as triphenylcarbonium cation and trisubstituted phenylcarbonium cation. Specific examples of trisubstituted phenylcarbonium cation include tri(methylphenyl)carbonium cation and tri(dimethylphenyl)carbonium cation.

Specific examples of the ammonium cation include trialkylammonium cation such as trimethylammonium cation, triethylammonium cation, tripropylammonium cation, tribuylammonium cation, tri(n-butyl)ammonium cation; and N,N-dialkylanilinium cation such as N,N-diethylanilinium cation, N,N-2,4,6-pentamethylanilinium cation; and dialkylammonium cation such as di(isopropyl)ammonium cation and dicyclohexylammonium cation.

Specific examples of the phosphonium cation include triarylphosphonium cation such as triphenylphosphonium cation, tri(methylphenyl)phosphonium cation and tri(dimethylphenyl)phosphonium cation.

Preferred examples of ionic compound (b) are trityl tetrakis(pentafluorophenyl)borate, triphenylcarboniumtetra(fluorophenyl)borate, N,N-dimethylanilinium tetrakis(pentafluorophenyl)borate and 1,1'-dimethylferrocenium tetrakis (pentafluorophenyl)borate.

<Compound (c)>

Examples of compound (c) promoting the release of the ligand in the complex constituting the main catalyst (A) include tris(pentafluorophenyl)boron, tris(monofluorophenyl)boron, tris(difluorophenyl)boron, triphenyl boron and biscyclooctadiene nickel.

<Phosphine Ligand (C)>

Examples of phosphine ligand used in the present invention include trialkylphosphine such as trimethylphosphine and triethylphosphine; and tricycloalkylphosphine such as tricyclopentylphosphine, tricyclohexylphosphine; and triarylphosphine such as triphenylphosphine.

In a preferable embodiment of the present invention, a norbornene copolymer is produced by using a complex as main catalyst (A) wherein, in formula (3), M represents nickel (Ni) or palladium (Pd); L represents cyclopentadienyl or indenyl; the other ligand is methyl (CH$_3$), chloride (Cl) or allyl (C$_3$H$_5$); tris(pentafluorophenyl)boron [B(C$_6$F$_5$)$_3$], trityl tetrakis(pentafluorophenyl)borate {[Ph$_3$C][B(C$_6$F$_5$)$_4$]} or methylaluminoxane (MAO) as cocatalyst (B); and further using tricyclohexylphosphine as phosphine ligand (C).

In the best embodiment of the present invention, a norbornene copolymer is produced by using a complex as main catalyst (A) wherein, in formula (3), M represents nickel (Ni) or palladium (Pd); L represents cyclopentadienyl; the other ligand is methyl (CH$_3$) or allyl (C$_3$H$_5$); and tris(pentafluorophenyl)boron [B(C$_6$F$_5$)$_3$] or trityl tetrakis(pentafluorophenyl)borate {Ph$_3$C[B(C$_6$F$_5$)$_4$]} as cocatalyst (B).

[Polymerization]

In the present invention, polymerization of a norbornene monomer using the above-mentioned main catalylst (A), cocatalyst (B) and phosphine ligand (C) may be performed by bulk polymerization or solution polymerization. When the polymerization is performed in a solvent, it is necessary to use a solvent which will not adversely affect the polymerization activity. Examples of a solvent that can be used include aliphatic hydrocarbon such as pentane, hexane and heptane; alicyclic hydrocarbon such as cyclohexane; aromatic hydrocarbon such as benzene, toluene and xylene; halogenated hydrocarbon such as dichloromethane, chloroform and chlorobenzen; nitrogen-containing hydrocarbon such as nitromethane, nitrobenzene and acetonitrile; and ether such as diethylether, dioxane and tetrahydrofurane. Two or more of these solvents may be used in mixture.

Main catalyst (A), cocatalyst (B) and phosphine ligand (C) are mixed when polymerization is performed. The order in which these are mixed is not particularly limited as long as main catalyst (A) is mixed with phosphine ligand (C) before (A) is placed in contact with cocatalyst (B). The component of main catalyst (A) and phosphine ligand (C) are mixed in advance and cocatalyst (B) is further added thereto to obtain a reaction composition and the composition may be added to a solution containing monomer to be polymerized.

Also, cocatalyst (B) may be added to a solvent containing monomer to be polymerized, main catalyst (A) and phosphine ligand (C); or a mixture of main catalyst (A) and phosphine ligand (C) may be added to a mixture solution of monomer to be polymerized and cocatalyst (B).

In the present invention, it is preferable to mix main catalyst (A) and phosphine ligand (C) in advance to be in contact with each other for more than one minute, preferably for about 30 minutes to one hour and then mixed with cocatalyst (B) to be added to a reaction system containing cocatalyst (B); or to add a mixture of main catalyst (A) and phosphine ligand (C) to a reaction system containing cocatalyst (B). Such an operation enables exhibition of enhanced polymerization activity.

The use ratio of the main catalyst (A) and cocatalyst (B) in the method of the present invention varies depending on conditions and cannot be uniformly defined, however, the ratio of (A)/(B) (molar ratio) is generally from 1/0.1 to 1/10,000, preferably from 1/0.5 to 1/5,000, still more preferably from 1/1 to 1/2,000.

The use ratio of the main catalyst (A) and phosphine ligand (C) in the method of the present invention varies depending on conditions and cannot be uniformly defined, however, the ratio of (A)/(C) (molar ratio) is generally from 1/0.1 to 1/2, preferably from 1/0.5 to 1/1.8, still more preferably from 1/1 to 1/1.5.

There is no particular limitation on the polymerization temperature but the temperature is generally from −100° C. to 150° C., preferably from −50° C. to 120° C. If the temperature is too low, it lowers the polymerization rate. If the temperature is too high, it lowers activity of the catalyst. The polymerization rate and molecular weight can be controlled by selecting the polymerization temperature within the above-mentioned range.

The polymerization time is not particularly limited and, for example, from one minute to 100 hours. Also, it is preferable to conduct reaction under inert gas atmosphere such as nitrogen gas.

After the completion of the polymerization reaction, norbornene copolymer as a reaction product can be subjected to post treatment by known operation and treating method (e.g. reprecipitation) and can be isolated through fractionation by filtration and subsequent drying.

EXAMPLES

Hereinafter, the present invention is described in more details by referring to Examples and Comparative Examples. The present invention is by no means limited thereto.

The weight average molecular weight (Mw), number average molecular weight (Mn) and molecular weight distribution (Mw/Mn) of the copolymer obtained in each Example were determined by gel permeation chromatography (GPC) using polystyrene as a standard substance. The composition ratio of norbornene and 5-acetoxymethyl-2-norbornene in the copolymer was determined by the integration ratio of [6:3.5-4.5 ppm; "—COOCH$_2$—" unit of 5-acetoxymethyl-2-norbornene] and [6:0.5-3.0; "—CH$_3$COO—", "—CH$_2$—" and "—CH=" units of norbornene and 5-aceoxymethyl-2-norbornene] at the peak in $^1$H-NMR spectra.

Properties of the substances synthesized in Examples and Comparative Examples were measured as follows.
1. $^1$H-NMR, $^{13}$C-NMR
Apparatus used: JEOL EX-400
 (400 MHz, manufactured by JEOL, LTD.) Measurement method: measured by dissolving samples in deuterated chloroform and using tetramethylsilane as internal standard.
2. FT-IR
Apparatus Used:
 System: Spectrum GX (manufactured by PerkinElmer, Inc.)
 ATR: MIRacle™ (manufactured by Pike Technologies)
Measurement Method:
 measured by a single reflection ATR method
3. Gel Permeation Chromatography (GPC)
Apparatus used:
 Column: Shodex GPC K-G+KF-806Lx2 (manufactured by SHOWA DENKO K.K.),
 Detector: Shodex SE-61 (manufactured by SHOWA DENKO K.K.),
Measurement Conditions
 Solvent: tetrahydrofuran,
 Measurement temperature: 40° C.,
 Flow rate: 1.0 ml/minute,
 Sample concentration: 1.0 mg/ml,
 Injection amount: 1.0 µl,
 Calibration curve: Universal Calibration curve,
 Analysis program: SIC 48011 (product of System Instruments, Inc.)

4. Tensile Test (Tensile Strength, Stretch)
Apparatus used: 5582 model universal tensile testing system (manufactured by Instron)
Test method: measured according to the method described in JIS K 7162
Shape of test samples: 5A type having thickness of about 0.03 mm
Measurement Conditions:
 Measurement temperature: 23° C.,
 Testing rate: 2 mm/minute,
 Distance between chucks: 50 mm
5. Total Light Transmission
The value was measured according to the method described in ASTM D1003.
6. Glass Transition Temperature (Tg)
Tan δ (the ratio (E"/E') of storage elastic modules (E') and loss elastic modules (E") determined by dynamic viscoelasticity was measured at a peak temperature in the temperature dispersion. The dynamic viscoelesticity was measured using RHEOVIBRON DDV-01FP (manufactured by Orientec Co., Ltd.) and the peak temperature of Tan δ was measured under conditions of measurement frequency of 10 Hz, heating rate of 4° C./minute, oscillation mode: single mode and amplitude of oscillation of 2.5 µm.
7. Water Absorption Rate
Test method: The value was measured according to the method described in JIS K 7209.
Measurement Conditions:
 Shape of test samples: 50×50×0.02 (mm),
 Dipping conditions: for 24 hours at 23° C.,
 Preliminary drying: for 24 hours at 50° C.
Cyclopentadienyl(n-allyl)palladium was synthesized according to the synthesizing method as taught by Shaw et al. (Shaw. B. L., Proc. Chem. Soc., 1960, 247)

Synthesis Example 1

Synthesis of 5-acetoxymethyl-2-norbornene

Dicyclopentadiene (manufactured by Wako Pure Chemical Industries Co., Ltd., 165.00 g, 1.248 mol), allyl acetate (manufactured by Tokyo Chemical Industry Co., Ltd., 312.40 g, 3.120 mol) and hydroquinone (manufactured by Wako Pure Chemical Industries Co., Ltd., 0.50 g, 0.0045 mol) were placed in a 1 liter-volume stainless-steel made autoclave. After the inside of the reaction system was substituted with nitrogen, the autoclave was heated to 180° C. while stirring the content at 400 rpm, and reaction was carried out for five hours. After the completion of the reaction, the autoclave was cooled to room temperature and the content was transferred to the distillation equipment to be distilled under reduced pressure. As a fraction at 0.9 MPa and 38° C., 207.56 g of a clear colorless liquid substance was obtained.

The $^1$H-NMR spectrum of the obtained liquid substance was measured and it was confirmed that the substance was the target 5-acetoxymethyl-2-norbornene. The molar ratio of exo isomer and endo isomer (exo/endo) of the obtained 5-acetoxymethyl-2-norbornene was 80:20.

Example 1

Addition Copolymerization of Norbornene and 5-acetoxymethyl-2-norbornene

After the inside of a two-neck flask equipped with a three-way stopcock was substituted with nitrogen, norbornene (manufactured by Tokyo Chemical Industry Co., Ltd., 11.80 g, 0.125 mol), 5-acetoxymethyl-2-norbornene prepared in Synthesis Example 1 (41.50 g, 0.250 mol) and trityl tetrakis(pentafluorophenyl)borate [Ph$_3$C][B(C$_6$F$_5$)$_4$] (manufactured by Tosoh Finechem Corporation, 93 mg, 0.100 mmol) were added thereto and dissolved in 60 ml of toluene. A catalyst solution separately prepared by dissolving cyclopentadienyl (π-allyl)palladium [(C$_5$H$_5$)Pd(C$_3$H$_5$)] (21 mg, 0.100 mmol) in 15 ml of toluene was added to the flask to carry out polymerization reaction at room temperature for 1.5 hours. Subsequently, a solution separately prepared by dissolving norbornene (manufactured by Tokyo Chemical Industry Co., Ltd., 11.80 g, 0.125 mol) in 60 ml of toluene was added to the reaction solution to carry out polymerization reaction for another three hours. After the completion of the reaction, the reaction solution was poured into a large amount of methanol to precipitate polymer. After being separated by filtration and washed, the polymer was dried under reduced pressure at 60° C. for five hours to obtain 42.5 g of polymer in white powder form.

Figure 1:
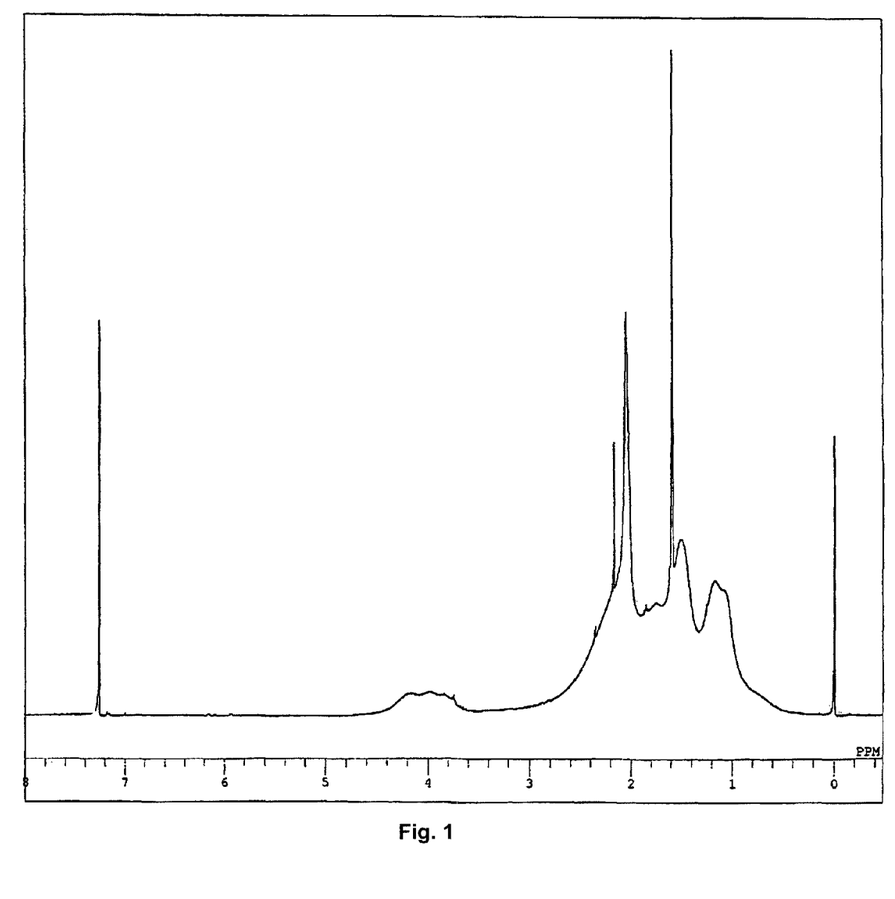
FIG. 1 is a $^1$H-NMR spectrum of the copolymer obtained in Example 1.
Figure 2:
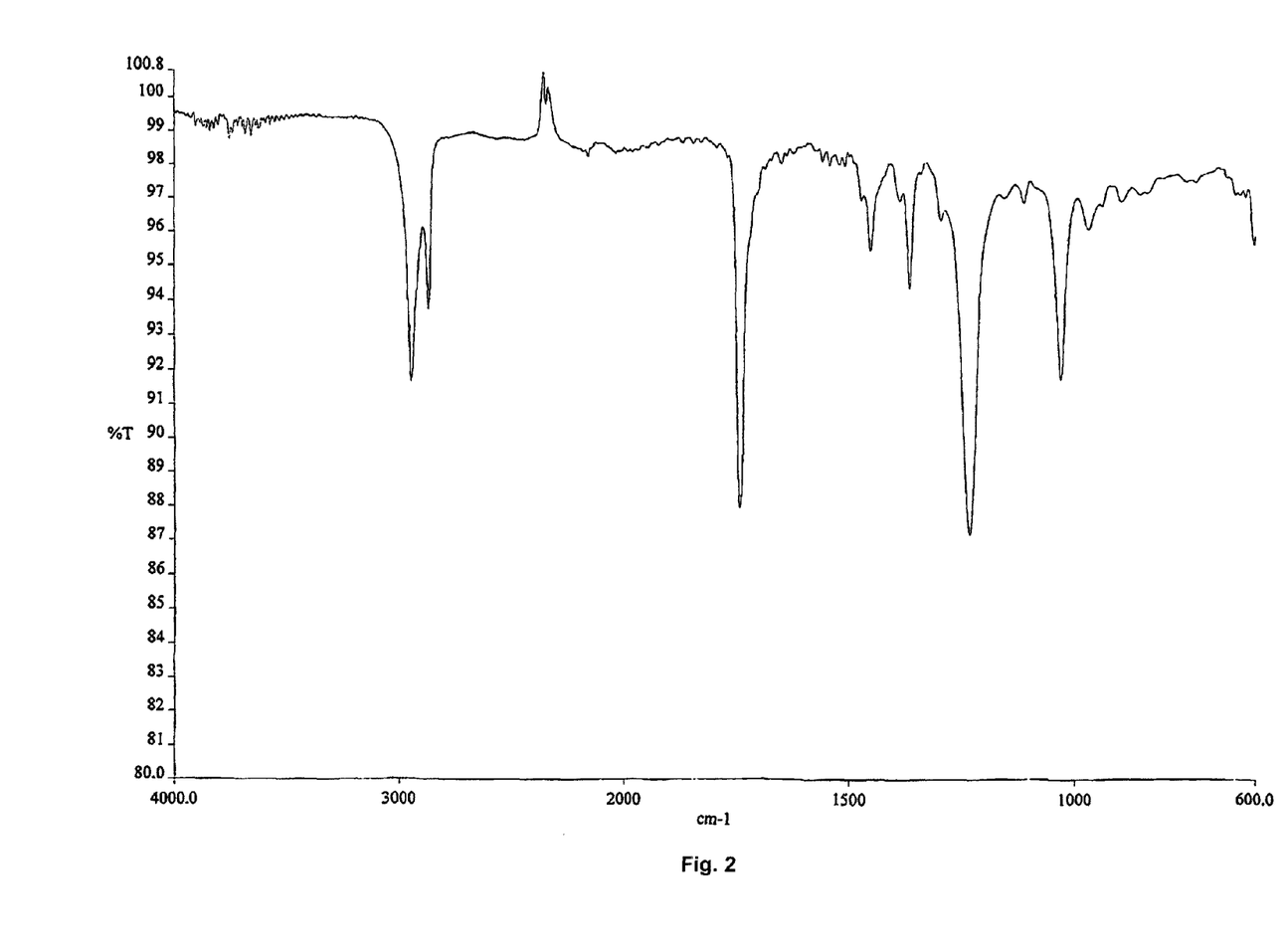
FIG. 2 is an IR spectrum of the copolymer obtained in Example 1.
Figure 5:
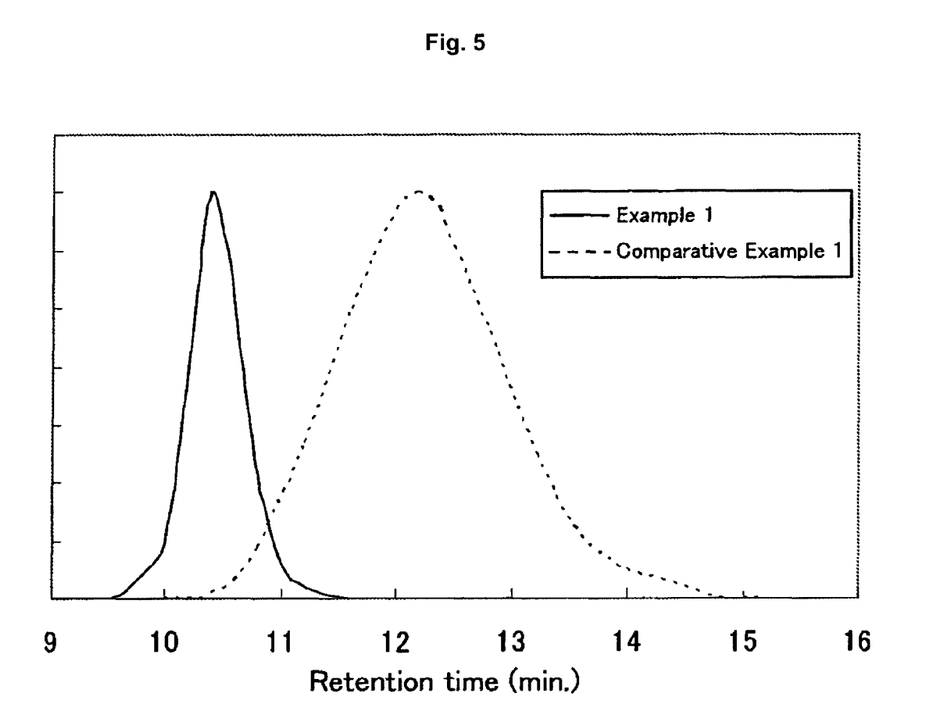
FIG. 5 is a gel permeation chromatography (GPC) chart of the copolymers obtained in Example 1 and Comparative Example 1.

The obtained polymer was readily dissolved in a general solvent such as THF and chloroform and had number average molecular weight (Mn) of 700,000 and molecular weight distribution (Mw/Mn) of 1.12. The composition ratio of 5-acetoxymethyl-2-norbornene monomer unit in the polymer determined by the integration ratio in $^1$H-NMR spectrum was 36.0 mol %. $^1$H-NMR spectrum, IR spectrum and GPC chart are shown in FIG. 1, FIG. 2 and FIG. 5, respectively.

After the polymer was further dissolved in toluene so as to have a concentration of 10 wt % and filtered using gauze, the filtered polymer was applied onto a polyethylene terephthalate (PET) film and dried at 120° C. for ten hours to obtain a cast film. The cast film had total light transmission of 91.5%, tensile fracture strength of 53.1 MPa, fracture elongation of 6.9%, Tg of 270° C. and water absorption rate of 0.1%.

Example 2

Addition Copolymerization of Norbornene and 5-acetoxymethyl-2-norbornene

Polymerization reaction was carried out in the same way as in Example 1 except changing the catalyst system to trityl tetrakis(pentafluorophenyl)borate [Ph$_3$C][B(C$_6$F$_5$)$_4$] (185 mg; 0.200 mmol), cyclopentadienyl(π-allyl)palladium [(C$_5$H$_5$)Pd(C$_3$H$_5$)] (43 mg; 0.200 mmol) tricyclohexylphosphine [P(C$_6$H$_{11}$)$_3$] (56 mg; 0.200 mmol) to obtain 50.0 g of polymer in white powder form.

Figure 3:
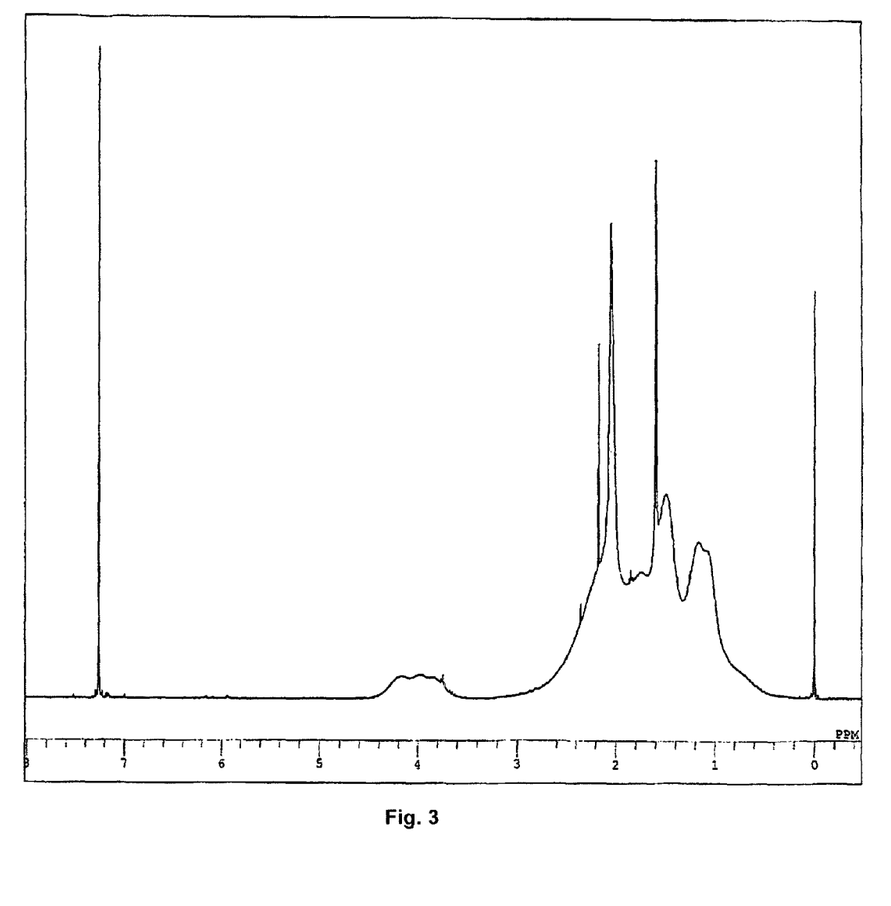
FIG. 3 is a $^1$H-NMR Spectrum of the copolymer obtained in Example 2.
Figure 4:
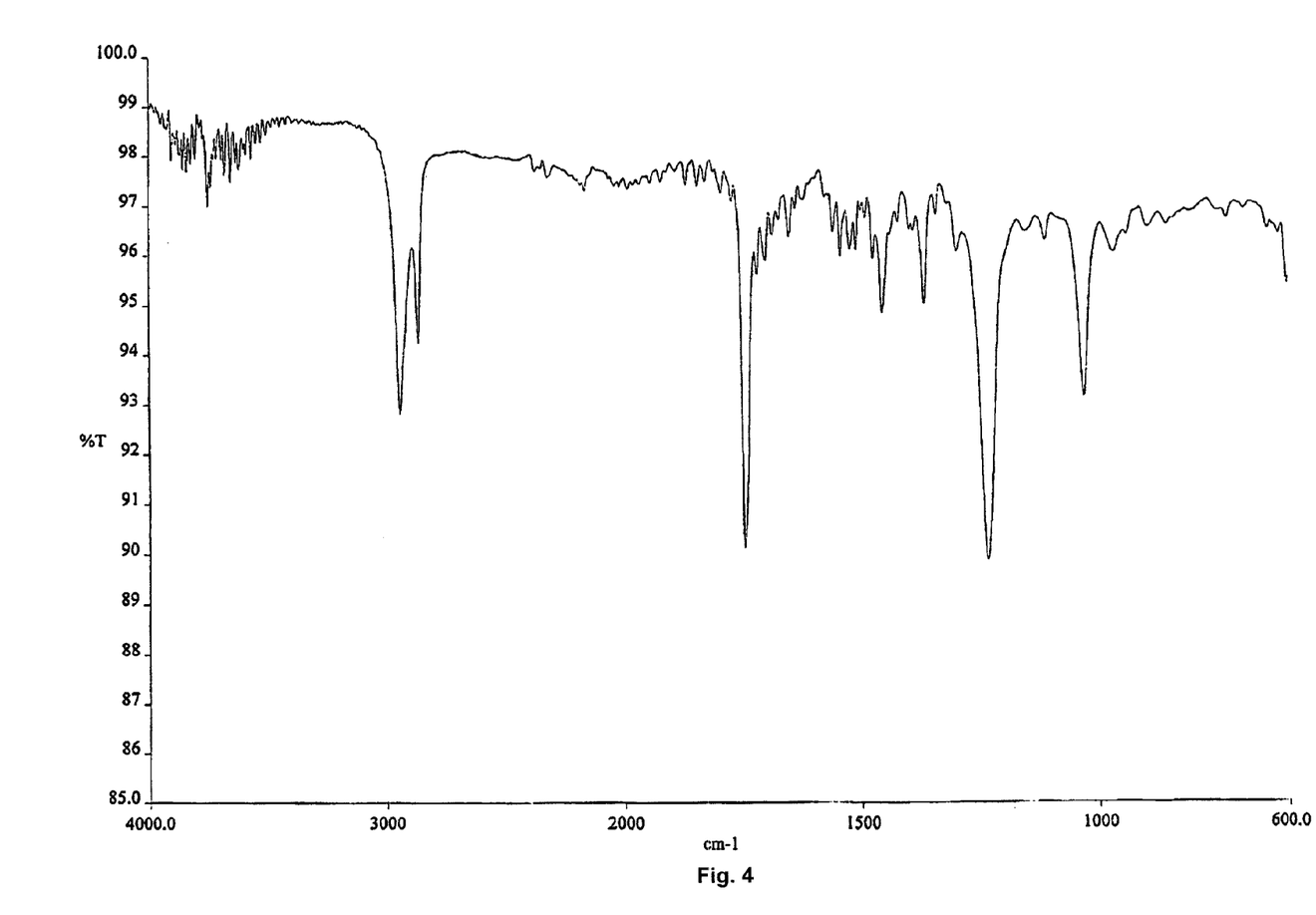
FIG. 4 is an IR Spectrum of the copolymer obtained in Example 2.

The obtained polymer was readily dissolved in a general solvent such as THF and chloroform and had number average molecular weight (Mn) of 303,700 and molecular weight distribution (Mw/Mn) of 1.22. The composition ratio of 5-acetoxymethyl-2-norbornene monomer unit in the polymer determined by the integration ratio in $^1$H-NMR spectrum was 37.5 mol %. $^1$H-NMR spectrum and IR spectrum are shown in FIG. 3 and FIG. 4, respectively.

Furthermore, a cast film using the polymer was obtained in the same way as in Example 1. The cast film had total light transmission of 91.3%, tensile fracture strength of 42.4 MPa, fracture elongation of 8.1%, Tg of 265° C. and water absorption rate of 0.1%.

Example 3

Addition Copolymerization of Norbornene and 5-acetoxymethyl-2-norbornene

After the inside of a two-neck flask equipped with a three-way stopcock was substituted with nitrogen, norbornene (5.90 g, 0.0625 mol), 5-acetoxymethyl-2-norbornene prepared in Synthesis Example 1 (33.2 g, 0.200 mol) and trityl tetrakis(pentafluorophenyl)borate [Ph$_3$C][B(C$_6$F$_5$)$_4$] (46 mg, 0.050 mmol) were added thereto and dissolved in 47 ml of toluene. A catalyst solution separately prepared by dissolving cyclopentadienyl(π-allyl)palladium [(C$_5$H$_5$)Pd(C$_3$H$_5$)] (10.6 mg, 0.050 mmol) and tricyclohexylphosphine [P(C$_6$H$_{11}$)$_3$] (14 mg; 0.050 mmol) in 15 ml of toluene was added to the flask to carry out polymerization reaction at room temperature for 1.5 hours. Next, a solution separately prepared by dissolving norbornene (5.90 g, 0.0625 mol) in 30 ml of toluene was added to the reaction solution to carry out polymerization reaction for another two hours. Subsequently, a solution separately prepared by dissolving norbornene (7.10 g, 0.750 mol) in 36 ml of toluene was added to the reaction solution to carry out polymerization reaction for still another three hours. After the completion of the reaction, the reaction solution was poured into a large amount of methanol to precipitate polymer. After being separated by filtration and washed, the polymer was dried under reduced pressure at 80° C. for five hours to obtain 27.5 g of polymer in white powder form.

The obtained polymer was readily dissolved in a general solvent such as THF and chloroform and had number average molecular weight (Mn) of 896,000 and molecular weight distribution (Mw/Mn) of 1.65. The composition ratio of 5-acetoxymethyl-2-norbornene monomer unit in the polymer determined by the integration ratio in $^1$H-NMR spectrum was 27.5 mol %.

Furthermore, a cast film using the polymer was obtained in the same way as in Example 1. The cast film had total light transmission of 91.3%, tensile fracture strength of 60.4 MPa, fracture elongation of 5.6%, Tg of 270° C. and water absorption rate of 0.1%.

Example 4

Addition Copolymerization of Norbornene and 5-acetoxymethyl-2-norbornene

After the inside of a two-neck flask equipped with a three-way stopcock was substituted with nitrogen, norbornene (6.89 g, 0.073 mol), 5-acetoxymethyl-2-norbornene prepared in Synthesis Example 1 (18.89 g, 0.114 mol) and trityl tetrakis(pentafluorophenyl)borate [Ph$_3$C][B(C$_6$F$_5$)$_4$] (46 mg, 0.050 mmol) were added thereto and dissolved in 33 ml of toluene. A catalyst solution separately prepared by dissolving cyclopentadienyl(π-allyl)palladium [(C$_5$H$_5$)Pd(C$_3$H$_5$)] (10.6 mg, 0.050 mmol) in 15 ml of toluene was added to the flask to carry out polymerization reaction at room temperature for 1.5 hours. Next, a solution separately prepared by dissolving norbornene (6.89 g, 0.073 mol) in 30 ml of toluene was added to the reaction solution to carry out polymerization reaction for another two hours. After the completion of the reaction, the reaction solution was poured into a large amount of methanol to precipitate polymer. After being separated by filtration and washed, the polymer was dried under reduced pressure at 80° C. for five hours to obtain 26.3 g of polymer in white powder form.

The obtained polymer was readily dissolved in a general solvent such as THF and chloroform and had number average molecular weight (Mn) of 355,000 and molecular weight distribution (Mw/Mn) of 1.35. The composition ratio of 5-acetoxymethyl-2-norbornene monomer unit in the polymer determined by the integration ratio in $^1$H-NMR spectrum was 28.9 mol %.

Furthermore, a cast film using the polymer was obtained in the same way as in Example 1. The cast film had total light transmission of 91.6%, tensile fracture strength of 43.4 MPa, fracture elongation of 7.9%, Tg of 270° C. and water absorption rate of 0.1%.

Example 5

Addition Copolymerization of Norbornene and 5-acetoxymethyl-2-norbornene

After the inside of a two-neck flask equipped with a three-way stopcock was substituted with nitrogen, norbornene (5.90 g, 0.0625 mol), 5-acetoxymethyl-2-norbornene prepared in Synthesis Example 1 (20.75 g, 0.125 mol) and trityl tetrakis(pentafluorophenyl)borate [$Ph_3C$][$B(C_6F_5)_4$] (46 mg, 0.050 mmol) were added thereto and dissolved in 33 ml of toluene. A catalyst solution separately prepared by dissolving cyclopentadienyl(n-allyl)palladium [$(C_5H_5)Pd(C_3H_5)$] (10.6 mg, 0.050 mmol) and tricyclohexylphosphine [$P(C_6H_{11})_3$] (14 mg, 0.050 mmol) in 15 ml of toluene was added to the flask to carry out polymerization reaction at room temperature for 1.5 hours. Next, a solution separately prepared by dissolving norbornene (5.90 g, 0.0625 mol) in 30 ml of toluene was added to the reaction solution to carry out polymerization reaction for another two hours. After the completion of the reaction, the reaction solution was poured into a large amount of methanol to precipitate polymer. After being separated by filtration and washed, the polymer was dried under reduced pressure at 80° C. for five hours to obtain 18.0 g of polymer in white powder form.

The obtained polymer was readily dissolved in a general solvent such as THF and chloroform and had number average molecular weight (Mn) of 345,000 and molecular weight distribution (Mw/Mn) of 1.77. The composition ratio of 5-acetoxymethyl-2-norbornene monomer unit in the polymer determined by the integration ratio in $^1$H-NMR spectrum was 42.4 mol %.

Furthermore, a cast film using the polymer was obtained in the same way as in Example 1. The cast film had total light transmission of 91.5%, tensile fracture strength of 43.1 MPa, fracture elongation of 8.1%, Tg of 267° C. and water absorption rate of 0.1%.

Example 6

Addition Copolymerization of Norbornene and 5-acetoxymethyl-2-norbornene

After the inside of a two-neck flask equipped with a three-way stopcock was substituted with nitrogen, norbornene (5.90 g, 0.0625 mol) and 5-acetoxymethyl-2-norbornene prepared in Synthesis Example 1 (20.75 g, 0.125 mol) were added thereto and dissolved in 30 ml of toluene. Furthermore, a solution of N,N-dimethylaniliniumtetrakis(pentafluorophenyl)borate [$(C_6H_5)(CH_3)_2NH$][$B(C_6F_5)_4$] (manufactured by, Strem Chmicals Inc., 40 mg, 0.050 mmol) in 2 ml of dichloromethane was added thereto. A catalyst solution separately prepared by dissolving cyclopentadienyl(n-allyl)palladium [$(C_5H_5)Pd(C_3H_5)$] (10.6 mg, 0.050 mmol) and tricyclohexylphosphine [$P(C_6H_{11})_3$] (14 mg, 0.050 mmol) in 15 ml of toluene was added to the flask to carry out polymerization reaction at room temperature for 1.5 hours. Next, a solution separately prepared by dissolving norbornene (manufactured by Tokyo Chemical Industry Co., Ltd.; 5.90 g, 0.0625 mol) in 30 ml of toluene was added to the reaction solution to carry out polymerization reaction for another two hours. After the completion of the reaction, the reaction solution was poured into a large amount of methanol to precipitate polymer. After being separated by filtration and washed, the polymer was dried under reduced pressure at 80° C. for five hours to obtain 17.2 g of polymer in white powder form.

The obtained polymer was readily dissolved in a general solvent such as THF and chloroform and had number average molecular weight (Mn) of 409,000 and molecular weight distribution (Mw/Mn) of 1.36. The composition ratio of 5-acetoxymethyl-2-norbornene monomer unit in the polymer determined by the integration ratio in $^1$H-NMR spectrum was 31.4 mol %.

After the polymer was further dissolved in toluene so as to have a concentration of 10 wt % and filtered using gauze, the filtered polymer was applied onto a polyethylene terephthalate (PET) film and dried at 120° C. for ten hours to obtain a cast film. The cast film had total light transmission of 91.3%, tensile fracture strength of 46.4 MPa, fracture elongation of 7.5%, Tg of 268° C. and water absorption rate of 0.1%.

Comparative Example 1

Addition Copolymerization of Norbornene and 5-acetoxymethyl-2-norbornene (According to the Method of Patent Document 4)

After the inside of a two-neck flask equipped with a three-way stopcock was substituted with nitrogen, 5-acetoxymethyl-2-norbornene prepared in Synthesis Example 1 (14.13 g, 0.085 mol) was added thereto and dissolved in 50 ml of toluene. Furthermore, a solution of allylpalladiumchloridedimer [[$(C_3H_5)PdCl]_2$] (manufactured by Wako Pure Chemical Industries Co., Ltd., 9 mg, 0.025 mol) dissolved in 1 ml of toluene, a solution of tricyclohexylphosphine [$P(C_6H_{11})_3$] (manufactured by Strem Chmicals Inc., 14 mg; 0.050 mmol) in 1 ml of toluene and a solution of N,N-dimethylaniliniumtetrakis(pentafluorophenyl)borate [$(C_6H_5)(CH_3)_2NH$][$B(C_6F_5)_4$] (manufactured by Strem Chmicals Inc., 60 mg, 0.075 mmol) in 1 ml of dichloromethane were added separately in that order. Next, the flask was dipped in an oil bath and heated to 90° C. while stirring the content. Reaction was initiated by adding a solution separately prepared by dissolving norbornene (manufactured by Tokyo Chemical Industry Co., Ltd.; 8.00 gm, 0.085 mol) in 10 ml of toluene and polymerization reaction was carried out at 90° C. for two hours. After the completion of the reaction, the reaction solution was poured into a large amount of methanol to precipitate polymer. After being separated by filtration and washed, the polymer was dried under reduced pressure at 60° C. for five hours to obtain 19.4 g of polymer in white powder form.

The obtained polymer was readily dissolved in a general solvent such as THF and chloroform and had number average molecular weight (Mn) of 58,000 and molecular weight distribution (Mw/Mn) of 2.06. The composition ratio of 5-acetoxymethyl-2-norbornene monomer unit in the polymer determined by the integration ratio in $^1$H-NMR spectrum was 37.3 mol %.

Furthermore, a cast film using the polymer was obtained in the same way as in Example 1. The cast film had total light transmission of 91.0%, tensile fracture strength of 31.8 MPa, fracture elongation of 3.8%, Tg of 260° C. and water absorption rate of 0.1%. The GPC chart is shown in FIG. 5.

Comparative Example 2

Addition Copolymerization of Norbornene and 5-acetoxymethyl-2-norbornene (According to the Method of Patent Document 4)

Polymerization reaction was carried out in the same way as in Example 1 except to change the catalyst system to allylpalladiumchloridedimer [[(C₃H₅)PdCl]₂] (4.5 mg, 0.0125 mmol) tricyclohexylphosphine [P(C₆H₁₁)₃] (7 mg; 0.025 mmol) and N,N-dimethylaniliniumtetrakis(pentafluorophenyl)borate [(C₆H₅)(CH₃)₂NH][B(C₆F₅)₄] (30 mg, 0.0375 mmol) and to carry out the reaction at 60° C. to obtain 4.3 g of polymer in white powder form.

The obtained polymer was readily dissolved in a general solvent such as THF and chloroform and had number average molecular weight (Mn) of 105,400 and molecular weight distribution (Mw/Mn) of 1.98. The composition ratio of 5-acetoxymethyl-2-norbornene monomer unit in the polymer (NB/PNB), number average molecular weight (Mn) of the copolymer obtained by addition copolymerization, molar ratio of NB and PNB in the copolymer (NB/PNB) and properties of the copolymer (total light transmission (%), tensile fracture strength (Pa), fracture elongation (%), glass transition temperature (Tg; ° C.) and water absorption (%)).

A copolymer having molecular weight (Mn) more than 200,000 could not have been produced according to the method of Patent Document 4. The norbornene copolymer of the present invention has high molecular weight and is excellent in mechanical properties.

TABLE 1

|  |  | Example 1 | Example 2 | Example 3 | Example 4 |
|---|---|---|---|---|---|
| Initial NB/PNB* (molar ratio) | | 50/50 | 50/50 | 50/50 | 57/43 |
| Catalyst | Main catalyst | $(C_5H_5)Pd(C_3H_5)$ | $(C_5H_5)Pd(C_3H_5)$ | $(C_5H_5)Pd(C_3H_5)$ | $(C_5H_5)Pd(C_3H_5)$ |
|  | Cocatalyst | $[Ph_3C][B(C_6F_5)_4]$ | $[Ph_3C][B(C_6F_5)_4]$ | $[Ph_3C][B(C_6F_5)_4]$ | $[Ph_3C][B(C_6F_5)_4]$ |
|  | Phosphine Ligand | $P(C_6H_{11})_3$ | $P(C_6H_{11})_3$ | $P(C_6H_{11})_3$ | $P(C_6H_{11})_3$ |
| Molecular weight | Mw | 784,000 | 370,500 | 1,478,000 | 479,000 |
|  | Mn | 700,000 | 303,700 | 896,000 | 355,000 |
|  | Mw/Mn | 1.12 | 1.22 | 1.65 | 1.35 |
| NB/PNB in polymer (molar ratio)* | | 64.0/36.0 | 62.5/37.5 | 72.5/27.5 | 71.1/28.9 |
| Total light transmission (%) | | 91.5 | 91.3 | 91.3 | 91.6 |
| Tensile fracture strength (MPa) | | 53.1 | 42.4 | 60.4 | 43.4 |
| Fracture elongation (%) | | 6.9 | 8.1 | 5.6 | 7.9 |
| Tg (° C.) | | 270 | 265 | 270 | 270 |
| Water absorption | | 0.1 | 0.1 | 0.1 | 0.1 |

|  |  | Example 5 | Example 6 | Comparative Example 1 | Comparative Example 2 |
|---|---|---|---|---|---|
| Initial NB/PNB* (molar ratio) | | 50/50 | 50/50 | 50/50 | 50/50 |
| Catalyst | Main catalyst | $(C_5H_5)Pd(C_3H_5)$ | $(C_5H_5)Pd(C_3H_5)$ | $[(C_3H_5)PdCl]_2$ | $[(C_3H_5)PdCl]_2$ |
|  | Cocatalyst | $[Ph_3C][B(C_6F_5)_4]$ | $[(C_6H_5)(CH_3)_2NH][B(C_6F_5)_4]$ | $[(C_6H_5)(CH_3)_2NH][B(C_6F_5)_4]$ | $[(C_6H_5)(CH_3)_2NH][B(C_6F_5)_4]$ |
|  | Phosphine Ligand | $P(C_6H_{11})_3$ | $P(C_6H_{11})_3$ | $P(C_6H_{11})_3$ | $P(C_6H_{11})_3$ |
| Molecular weight | Mw | 611,000 | 556,000 | 119,500 | 208,700 |
|  | Mn | 345,000 | 409,000 | 58,000 | 105,400 |
|  | Mw/Mn | 1.77 | 1.36 | 2.06 | 1.98 |
| NB/PNB in polymer (molar ratio)* | | 57.6/42.4 | 68.6/31.4 | 62.7/37.3 | 81.8/18.2 |
| Total light transmission (%) | | 91.5 | 91.3 | 91.0 | 91.0 |
| Tensile fracture strength (MPa) | | 43.1 | 46.4 | 31.8 | 30.7 |
| Fracture elongation (%) | | 8.1 | 7.5 | 3.8 | 5.6 |
| Tg (° C.) | | 267 | 268 | 260 | 300 |
| Water absorption (%) | | 0.1 | 0.1 | 0.1 | 0.1 |

*NB: norbornene, PNB: 5-acetoxymethyl-2-norbornene determined by the integration ratio in ¹H-NMR spectrum was 18.2 mol %.

Furthermore, a cast film using the polymer was obtained in the same way as in Example 1. The cast film had total light transmission of 91.0%, tensile fracture strength of 30.7 MPa, fracture elongation of 5.6%, Tg of 300° C. and water absorption rate of 0.1%.

With respect to Examples 1 to 6 and Comparative Examples 1 to 2, Table 1 shows used catalysts (main catalyst, cocatalyst and phosphine ligand), initial molar ratio of norbornene (NB) and 5-acetoxymethyl-2-norbornene (PNB)

INDUSTRIAL APPLICABILITY

The norbornene copolymer obtained by the present invention has excellent properties such as transparency, heat resistance, low water absorption and electric insulating property, and can be used for optical molded products such as lenses and polarizing films; films, carrier tapes, film capacitors, electric insulating materials for flexible printed circuit boards and the like; and medical containers such as press-through packages, infusion bags and chemical vials; food-packaging molded product such as plastic wraps and trays; casings for electric appliances; automobile interior parts such as an inner panel; building materials for a carport, glazing and the like; etc.

The invention claimed is:

1. A norbornene copolymer comprising a monomer unit represented by formula (1) and formula (2)

(1)

(2)

and having a number average molecular weight (Mn) of 300,000 to 2,000,000;
in the formulae, $R^1$, represents an alkyl group having 1 to 10 carbon atoms; and $R^2$, $R^3$ and $R^4$ independently represent a hydrogen atom or an alkyl group having 1 to 10 carbon atoms.

2. The norbornene copolymer as claimed in claim 1 comprising a monomer unit represented by formula (1) and formula (2) only.

3. The norbornene copolymer as claimed in claim 1 having a molecular weight distribution (Mw/Mn) of 1.0 to 2.5.

4. The norbornene copolymer as claimed in claim 1, wherein $R^1$ in formula (1) is a methyl group.

5. The norbornene copolymer as claimed in claim 1, wherein $R^2$ in formula (1) and $R^3$ and $R^4$ in formula (2) is a hydrogen atom.

6. The norbornene copolymer as claimed in claim 1, comprising the monomer unit represented by formula (1) in an amount of 10 to 70 mol %.

7. A method for producing the norbornene copolymer as claimed in claim 1 characterized in using a catalyst comprising the following main catalyst (A), cocatalyst (B) and phosphine ligand (C):
main catalyst (A):
a complex represented by formula (3)

$$ML_nK1_xK2_yK3_z \qquad (3)$$

(In the formula, M represents one transition metal selected from the elements belonging to eight, nine or ten group of the periodic table; L represents cyclopentadienyl ligand comprising cyclopentadienyl or a derivative thereof; K1, K2 and K3 represent an anionic ligand or a neutral ligand which are different from each other; n is an integer of 1 to 3; x, y and z are 0 or an integer the total of which comes to 1 to 7)
cocatalyst (B):
at least one compound selected from an organic aluminum compound (a), an ionic compound (b) capable of producing a cationic transition metal compound through the reaction with the main catalyst (A) and a compound (c) promoting the release of the ligand in the complex constituting the main catalyst (A),
phosphine ligand (C).

8. A method for producing the norbornene copolymer as claimed in claim 7, wherein in formula (3) representing a main catalyst (A) M is nickel or palladium; L is cyclopentadienyl; and K1, K2 and K3 independently represent methyl group or allyl group.

9. A method for producing the norbornene copolymer as claimed in claim 8, wherein the main catalyst (A) is cyclopentadienyl(π-allyl)palladium.

10. A method for producing the norbornene copolymer as claimed in claim 7, wherein the cocatalyst (B) is tris(pentafluorophenyl)boron, trityltetrakis(pentafluorophenyl)borate or N,N-dimethylaniliniumtetrakis(pentafluorophenyl)borate.

11. The norbornene copolymer as claimed in claim 2 having a molecular weight distribution (Mw/Mn) of 1.0 to 2.5.

12. The norbornene copolymer as claimed in claim 2, wherein $R^1$ in formula (1) is a methyl group.

13. The norbornene copolymer as claimed in claim 2, wherein $R^2$ in formula (1) and $R^3$ and $R^4$ in formula (2) is a hydrogen atom.

14. The norbornene copolymer as claimed in claim 2, comprising the monomer unit represented by formula (1) in an amount of 10 to 70 mol %.

* * * * *